United States Patent
Okada et al.

(10) Patent No.: US 8,532,871 B2
(45) Date of Patent: Sep. 10, 2013

(54) MULTI-MODAL VEHICLE OPERATING DEVICE

(75) Inventors: Reiko Okada, Tokyo (JP); Kiyoshi Matsutani, Tokyo (JP); Atsushi Kohno, Tokyo (JP); Fumitaka Sato, Tokyo (JP); Yuta Kawana, Tokyo (JP); Wataru Yamazaki, Tokyo (JP)

(73) Assignee: Mitsubishi Electric Company, Tokyo (JP)

( * ) Notice: Subject to any disclaimer, the term of this patent is extended or adjusted under 35 U.S.C. 154(b) by 914 days.

(21) Appl. No.: 12/599,545

(22) PCT Filed: Mar. 14, 2008

(86) PCT No.: PCT/JP2008/000595
§ 371 (c)(1),
(2), (4) Date: Nov. 10, 2009

(87) PCT Pub. No.: WO2008/149482
PCT Pub. Date: Dec. 11, 2008

(65) Prior Publication Data
US 2011/0218696 A1 Sep. 8, 2011

(30) Foreign Application Priority Data
Jun. 5, 2007 (JP) .................................. 2007-149605

(51) Int. Cl.
*G06F 7/00* (2006.01)
(52) U.S. Cl.
USPC .................................. 701/36; 704/246; 345/7
(58) Field of Classification Search
USPC .................. 701/431, 432, 436, 443–444, 36; 704/200, 246; 345/7–9
See application file for complete search history.

(56) References Cited

U.S. PATENT DOCUMENTS

| 6,112,174 A * | 8/2000 | Wakisaka et al. ............. 704/251 |
| 7,158,871 B1 * | 1/2007 | Ilan et al. ......................... 701/49 |
| 2002/0041260 A1 * | 4/2002 | Grassmann ........................ 345/7 |
| 2003/0216861 A1 * | 11/2003 | Sakata .......................... 701/211 |
| 2004/0189720 A1 | 9/2004 | Wilson et al. |
| 2005/0134117 A1 * | 6/2005 | Ito et al. ........................ 307/10.1 |
| 2006/0047386 A1 * | 3/2006 | Kanevsky et al. .............. 701/36 |
| 2006/0136846 A1 * | 6/2006 | Im et al. ......................... 715/863 |
| 2007/0005206 A1 * | 1/2007 | Zhang et al. .................... 701/36 |
| 2007/0194902 A1 * | 8/2007 | Blanco et al. ................. 340/461 |
| 2008/0192005 A1 * | 8/2008 | Elgoyhen et al. ............. 345/158 |
| 2009/0102788 A1 * | 4/2009 | Nishida et al. ................ 345/158 |
| 2011/0022393 A1 * | 1/2011 | Waller et al. .................. 704/270 |

FOREIGN PATENT DOCUMENTS

| DE | 102005017313 A1 | 10/2006 |
| DE | 10 2005 051 175 A1 | 4/2007 |
| JP | 9-34488 A | 2/1997 |
| JP | 2000-075991 A | 3/2000 |
| JP | 2000-344028 A | 12/2000 |
| JP | 2005-178473 A | 7/2005 |

\* cited by examiner

*Primary Examiner* — Darnell Jayne
*Assistant Examiner* — Sasha T Varghese
(74) *Attorney, Agent, or Firm* — Birch, Stewart, Kolasch & Birch, LLP

(57) ABSTRACT

A vehicle operating device includes: a voice operation unit (3) for recognizing an uttered voice and outputting a voice recognition result; a spatial operation unit (2) for recognizing a movement performed within a predetermined space and outputting a spatial recognition result; a main processing unit (4) for executing a processing corresponding to the voice recognition result and the spatial recognition result; and a display unit (5) for displaying an image generated in accordance with an instruction from the main processing unit, the image being superimposed on an actual scene that can be viewed through a windshield.

17 Claims, 11 Drawing Sheets

FIG. 5

↓
Depth Detection — ST41
↓
Image Detection Processing — ST42
↓
Image Recognition Processing — ST43
↓
Result Processing — ST44
↓

FIG. 6

| Recognition Pattern | Menu Display Shape | Menu Display Image |
|---|---|---|
| Grabbing Movement | Ball-shaped | ● |
| Pressing Movement | Button-shaped | ⊡ |

FIG. 7

| Recognition Pattern | Icon Display Image |
|---|---|
| Operation to Raise One Finger | ☝ |
| Operation to Wave Hand to Left And Right | 🖐 |

| Menu Item | Name | Location | ~ | Detailed Information |
|---|---|---|---|---|
| Item 1 | ○○○ | ×ated×× | ~ | |
| Item 2 | △△△ | ○○○○ | ~ | |

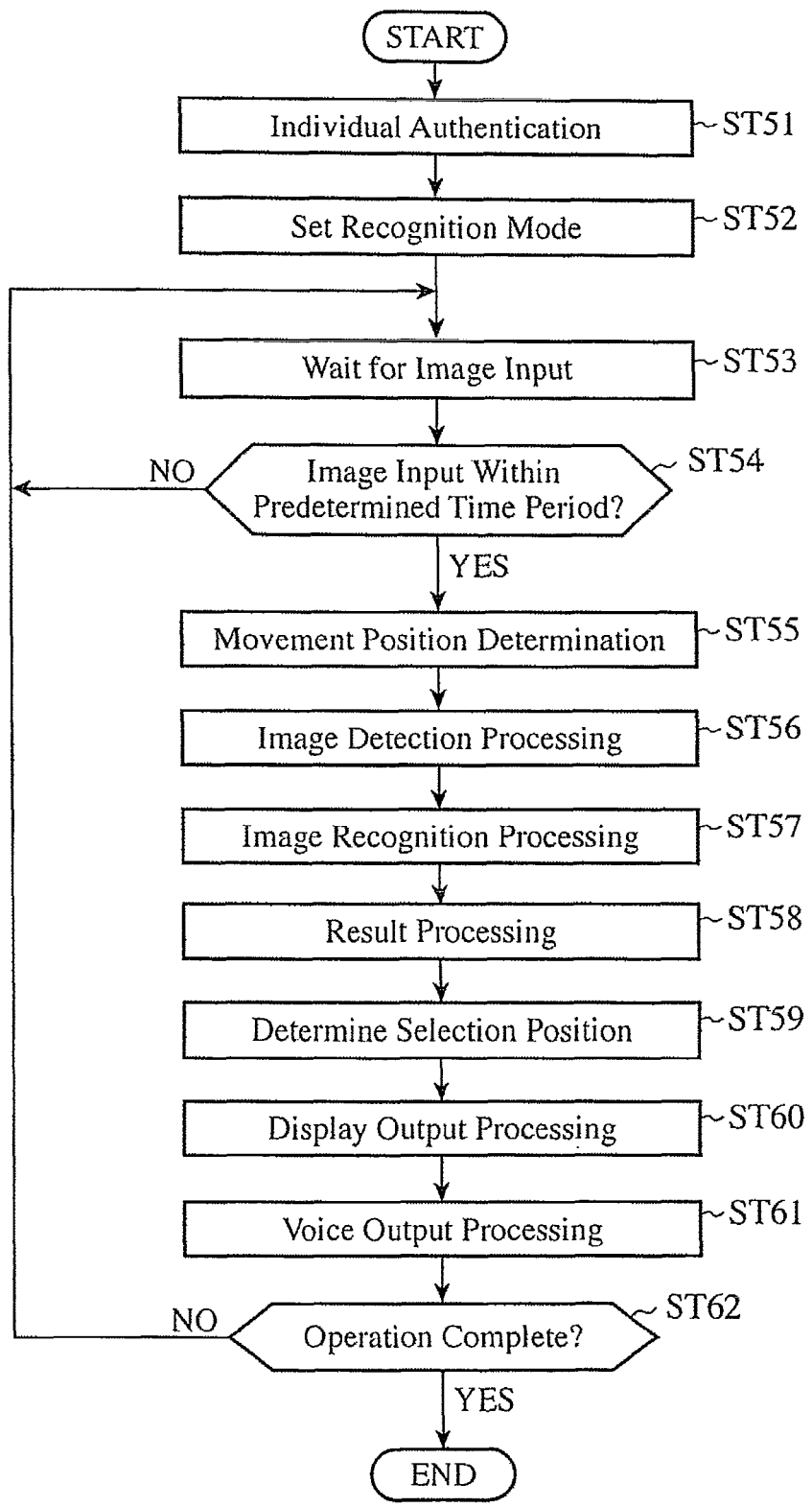

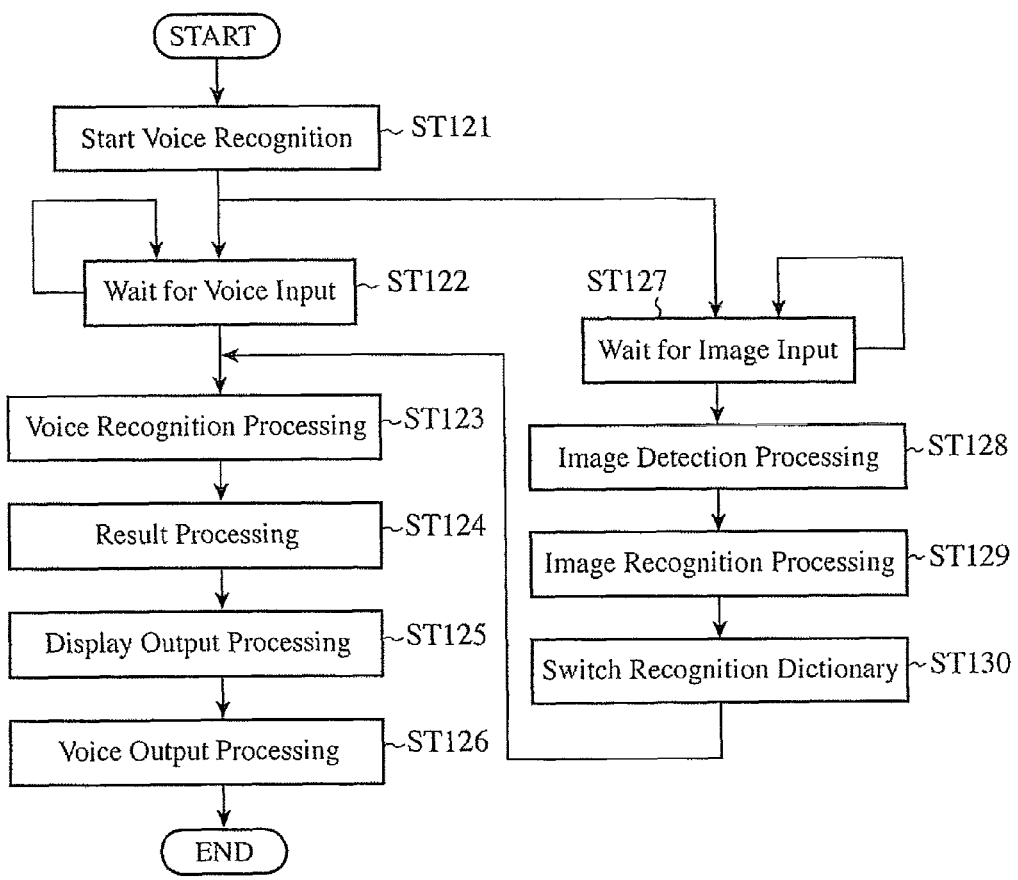

MULTI-MODAL VEHICLE OPERATING DEVICE

TECHNICAL FIELD

This invention relates to a vehicle operating device for operating a vehicle or an on-board instrument, and more particularly to a technique for improving operability.

BACKGROUND ART

A voice operation for performing an operation using voice alone is known as a method of operating a vehicle or an on-vehicle instrument easily while driving the vehicle. Using voice operations, operations such as periphery searches and music searches can be performed. For example, when an utterance such as "nearby restaurants" is made, a search for nearby restaurants is performed and search results are output as candidates. The user can then perform an operation to select a desired restaurant from the candidates.

However, in order to select a desired one from the candidates obtained as the search results through a voice operation, the user must check the candidates one by one and perform a determination operation. Therefore, numerous voice operations are required, which is troublesome and makes intuitive operations impossible. Furthermore, in a voice operation, voice recognition results are displayed on a monitor of a navigation device, for example, and therefore the operator must look at the monitor to check the results. Therefore, there is a problem such that the operator's line of sight may shift, thus causing an inconvenience during driving.

To reduce the troublesomeness of a voice operation, a multi-modal constitution in which operations can also be performed using a remote controller (hereinafter, abbreviated to 'remocon') or a touch panel may be adopted, but in the case of a remote controller, there is a limit to the number of operations that can be performed using a fixed number of keys, and moreover, when a large number of keys is provided, operations become complicated and the operations allocated to each key cannot be learned easily, making intuitive operations impossible. In the case of a touch panel, operations are performed by touching the monitor, and therefore the operator must necessarily look at the monitor, thus involving a shift in the operator's line of sight. Hence, there is a problem such that the convenience of touch panel operations during driving is poor.

In order to solve these problems, Patent Document 1 discloses an information input device with which an on-vehicle instrument can be operated while maintaining a driving posture by using spatial operations instead of voice operations. In this information input device, a driver raises a hand so as to enter a range of a virtual space and then opens the closed hand. This hand movement is picked up by a camera and when a resulting image and position correspond to a predetermined image and position, a standby state in which input is possible is established. The driver then uses the hand to grab a desired menu space from among a plurality of menu spaces provided in the virtual space. This movement is picked up similarly by the camera, whereupon the movement and position of the hand are recognized and the menu space grabbed by the hand is determined. A determination result is then supplied to a navigation device. The determination result is also called back to the driver by voice.

Further, Patent Document 2 discloses an on-vehicle instrument interface with which the instrument can be operated using a combination of voice recognition and spatial operations. According to this on-vehicle instrument interface, when characteristic data are matched between an input voice based on an utterance of an operator and a demonstrative pronoun registered in a voice dictionary, and further it is confirmed within a preset allowable time period that a gesture (a hand shape) of the operator matches a registered pattern registered in a hand dictionary, the on-vehicle instrument interface specifies an on-vehicle instrument associated with the matching registered pattern as a subject instrument and obtains an operational state of the subject instrument. A control command for switching the acquired operational state to another operational state is then created, whereupon the control command is transmitted to the subject instrument. In other words, the subject instrument having the operational state to be switched is specified by a combination of a voice (the demonstrative pronoun) and a gesture (pointing).

Patent Document 1: Japanese Unexamined Patent Publication No. 2000-75991
Patent Document 2: Japanese Unexamined Patent Publication No. 2005-178473

However, in the technique disclosed in Patent Document 1, the menu for the spatial operation is displayed on a monitor of the navigation device and the operator must perform an operation relying on voice callbacks on the assumption that the menu is virtually provided in a space which there is no existence in reality. Hence, intuitive operations are impossible. Moreover, to check the menu display, the operator has to look at the monitor of the navigation device, and therefore the operator's line of sight may shift, which is problematic in operations during traveling. Furthermore, with this technique, all operations are performed using spatial operations and voice operations are not performed. Therefore, in the case of a deeply hierarchical operation such as a search, there is a problem such that a large number of selection procedures must be performed on spatial operations.

Further, with the technique disclosed in Patent Document 2, voice operations such as utterance of the demonstrative pronoun "this" or the like are simply used just for triggering spatial operations, and therefore the various words required for searches and so on are not recognized. Moreover, with this technique, the operation subject instrument is specified and operated by pointing at the instrument in a spatial operation, and a display unit such as a monitor is not provided. Therefore, only simple operations such as switching on/off of the pointed instrument can be performed.

DISCLOSURE OF THE INVENTION

This invention has been designed to solve the problems described above, and an object thereof is to provide a vehicle operating device with which operations can be performed intuitively, easily, and conveniently even during driving without disturbing a driving posture and without shifting a driver's line of sight.

In order to solve the problems described above, a vehicle operating device according to this invention includes: a voice operation unit for recognizing an uttered voice and outputting a recognition result; a spatial operation unit for recognizing a movement performed within a space and outputting a recognition result; a main processing unit for executing a processing corresponding to the recognition result transmitted from the voice operation unit and the recognition result transmitted from the spatial operation unit; and a display unit for displaying an image generated in accordance with an instruction from the main processing unit, superimposed on an actual scene that can be viewed through a windshield.

In the vehicle operating device according to this invention, an image corresponding to a voice operation or a spatial operation can be displayed on the display unit, and moreover, the vehicle operating device can be operated using voice operations or spatial operations. Therefore, an operation that would be troublesome if performed through a voice operation alone, for example, can be performed intuitively, easily, and conveniently even during driving without disturbing a driving posture and without shifting a driver's line of sight through combined use of a superimposed display on a windshield and a spatial operation.

BRIEF DESCRIPTION OF THE DRAWINGS

FIG. 5 is a flowchart showing an operation of a vehicle operating device in accordance with a third embodiment of this invention;

FIG. 6 is a view showing an association table used in the vehicle operating device in accordance with the third embodiment of this invention;

FIG. 7 is a view showing an association table used in a vehicle operating device in accordance with a sixth embodiment of this invention;

FIG. 9 is a flowchart showing an operation of the vehicle operating device in accordance with the seventh embodiment of this invention;

FIG. 17 is a view showing an association table used in a vehicle operating device in accordance with a fourteenth embodiment of this invention; and FIG. 18 is a flowchart showing an operation of the vehicle operating device in accordance with the fourteenth embodiment of this invention.

BEST MODE FOR CARRYING OUT THE INVENTION

Embodiments of this invention will be described in detail below with reference to the drawings.

First Embodiment

Figure 1:
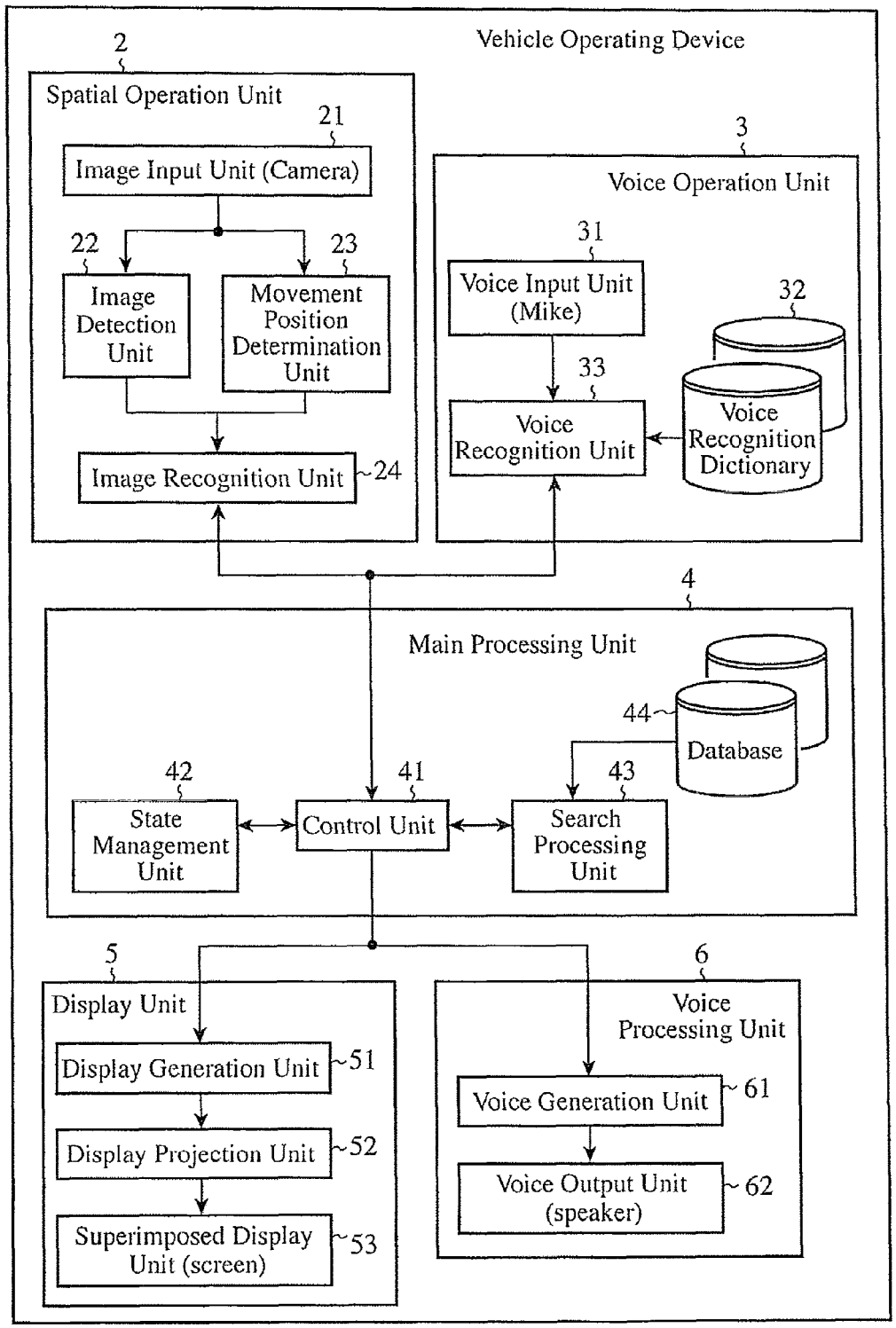
FIG. 1 is a block diagram showing the constitution of a vehicle operating device in accordance with a first embodiment of this invention.

FIG. 1 is a block diagram showing the constitution of a vehicle operating device in accordance with a first embodiment of this invention. The vehicle operating device includes a spatial operation unit 2, a voice operation unit 3, a main processing unit 4, a display unit 5, and a voice processing unit 6.

The spatial operation unit 2 is used to realize a spatial operation. The spatial operation unit 2 includes an image input unit 21, an image detection unit 22, a movement position determination unit 23, and an image recognition unit 24. The image input unit 21 is constituted by a camera that picks up a movement performed by an operator as a spatial operation, for example. The camera serving as the image input unit 21 is disposed in a position allowing it to pick up hand movements of the user easily, for example a lower portion of a front panel, an upper portion of a windshield, and so on. An image obtained through image pickup by the image input unit 21 is transmitted to the image detection unit 22 and the movement position determination unit 23.

The image detection unit 22 detects and extracts an image part required for recognition from the image transmitted by the image input unit 21. For example, the image detection unit 22 determines the part required for recognition by detecting the shape or color of the hand, and extracts only the hand part of the image from the image transmitted by the image input unit 21. The image extracted by the image detection unit 22 is transmitted to the image recognition unit 24.

The movement position determination unit 23 determines a movement position within a space in order to prevent erroneous recognition. More specifically, the movement position determination unit 23 includes an infrared sensor or the like, for example, and uses this infrared sensor to determine the position of an image of a moved hand or the like. The movement position determined by the movement position determination unit 23 is transmitted to the image recognition unit 24.

The image recognition unit 24 recognizes the content of the movement on the basis of the image transmitted from the image detection unit 22 and the movement position transmitted from the movement position determination unit 23. For example, the image recognition unit 24 analyzes the image transmitted from the image detection unit 22, recognizes the type of movement that has been performed from the shape, movement, tilt, position, and so on of the hand, and transmits a recognition result to the main processing unit 4.

The voice operation unit 3 is used to realize a voice operation. The voice operation unit 3 includes a voice input unit 31, a voice recognition dictionary 32, and a voice recognition unit 33. The voice input unit 31 is constituted by a microphone (to be abbreviated to "mike" hereafter) for inputting an utterance uttered by the operator as a voice operation, for example. The mike serving as the voice input unit 31 is disposed in a position easily taking in the voice uttered by the operator easily. Voice data input from the voice input unit 31 are transmitted to the voice recognition unit 33.

The voice recognition dictionary 32 holds words or vocabularies as a subject to be recognized during a voice operation. More specifically, the voice recognition dictionary 32 is a database holding vocabularies serving as voice recognition subjects, and is constituted by a plurality of dictionaries storing a plurality of vocabularies classified into facility names, addresses, song names, and so on, for example. During voice recognition, one recognition dictionary from the voice recognition dictionary 32 is activated so that the user can specify a vocabulary as a subject to be recognized. The vocabularies stored in the voice recognition dictionary 32 are read by the voice recognition unit 33.

The voice recognition unit 33 analyzes the voice data input from the voice input unit 31 and performs a matching processing between the analyzed results and the vocabularies and grammars stored in the activated recognition dictionary from the voice recognition dictionary 32 to draw one vocabulary. The vocabulary drawn by the voice recognition unit 33 is transmitted to the main processing unit 4 as a recognition result.

The display unit 5 displays an image generated in accordance with an instruction from the main processing unit 4 superimposed onto the actual scene that can be viewed through the windshield. The display unit 5 includes a display generation unit 51, a display projection unit 52, and a superimposed display unit 53. The display generation unit 51 generates an image signal to be projected in the display projection unit 52 in response to an instruction from the main processing unit 4. The image signal generated by the display generation unit 51 is transmitted to the display projection unit 52. The display projection unit 52 is constituted by a projector, for example, which generates an image on the basis of the image signal transmitted from the display generation unit 51 and projects the generated image onto the superimposed display unit 53.

The superimposed display unit 53 is constituted by a screen allowing an image to be displayed in a superimposed manner onto the actual scene that can be viewed through the windshield, for example. The screen serving as the superimposed display unit 53 may be provided, for example, in the form of a transparent film adhered to the windshield or a film, a resin, or the like sandwiched between the windshield. Note that a method other than those described above may be used to provide the screen.

The voice processing unit 6 is used to output voice guidance. The voice processing unit 6 includes a voice generation unit 61 and a voice output unit 62. The voice generation unit 61 generates a voice signal in accordance with an instruction from the main processing unit 4. The voice signal generated by the voice generation unit 61 is transmitted to the voice output unit 62. The voice output unit 62 is constituted by a speaker, for example, which generates a voice in accordance with the voice signal transmitted from the voice generation unit 61.

The main processing unit 4 performs overall control of the vehicle operating device. The main processing unit 4 includes a control unit 41, a state management unit 42, a search processing unit 43, and a database 44. The control unit 41 controls the entire vehicle operating device upon reception of the spatial operation recognition result transmitted from the image recognition unit 24 and the voice operation recognition result transmitted from the voice recognition unit 33. For example, the control unit 41 displays a menu for operating the vehicle operating device on the display unit 53 in accordance with the voice operation recognition result transmitted from the voice recognition unit 33, and executes a processing (search processing, for example) on an item selected from the menu in accordance with the spatial operation recognition result transmitted from the image recognition unit 24.

The state management unit 42 manages state transitions during an operation procedure. The control unit 41 reads data managed by the state management unit 42 in relation to each operation procedure and advances the processing while performing state transitions according to the read data. The search processing unit 43 searches the database 44 for a facility used in on-vehicle information held in the navigation device, for example, a piece of music, or the like in response to an instruction from the control unit 41. Data relating to the facility, piece of music, or the like found by the search processing unit 43 are transmitted to the control unit 41. The database 44 stores data relating to facilities used during searches, music, and so on. The database 44 is accessed by the search processing unit 43 in the manner described above.

Next, an operation of the vehicle operating device in accordance with the first embodiment of this invention, constituted as described above, will be described with reference to a flowchart shown in FIG. 2, centering on an operation processing for realizing a voice operation and a spatial operation. This operation processing is triggered by pressing of an utterance switch (not shown).

In the operation processing, first, a voice recognition start processing is performed (step ST11). More specifically, the control unit 41 transmits a voice recognition start command to the voice recognition unit 33. As a result, voice recognition processing is started, and the vehicle operating device enters a standby state awaiting voice input uttered by the operator. Next, a determination is made as to whether or not voice input has been received within a predetermined time period (step ST12). More specifically, the voice recognition unit 33 determines whether or not voice data have been transmitted from the voice input unit 31 within a predetermined time period. When it is determined in the step ST12 that a voice input has not been received within the predetermined time period, the operation processing is completed.

When it is determined in the step S12 that the voice input has been received within the predetermined time period, on the other hand, a voice recognition processing is performed (step ST13). More specifically, the voice recognition unit 33 analyzes the voice data input from the voice input unit 31, executes a matching processing between the analyzed results and the vocabulary or words stored in the voice recognition dictionary 32 to draw one vocabulary, and transmits the drawn vocabulary to the control unit 41. For example, when the operator utters "nearby restaurants", the uttered voice is input through the mike constituting the voice input unit 31 and a matching processing with the vocabulary and grammar stored in the voice recognition dictionary 32 is performed. As a result, one vocabulary is obtained as a recognition result. The vocabulary obtained as the recognition result is then transmitted to the control unit 41 of the main processing unit 4.

Next, a result processing is performed (step ST14). More specifically, the control unit 41 performs a processing corresponding to the voice operation recognition result received from the voice recognition unit 33. For example, when the voice operation recognition result is a search instruction, the control unit 41 issues a search instruction by transmitting the instruction to the search processing unit 43. In response to the instruction from the control unit 41, the search processing unit 43 searches the database 44 and transmits information obtained as a result of the search to the control unit 41. For example, when an instruction to search for "nearby restaurants" is issued, a facility database included in the database 44 is searched for information relating to restaurants in the vicinity of the current location and the obtained information is transmitted to the control unit 41.

Figure 3:
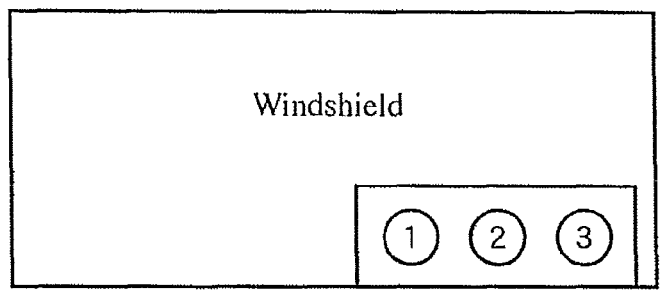
FIG. 3 is a view showing an example of an image superimposed onto a windshield in the vehicle operating device in accordance with the first embodiment of this invention.

Next, a display output processing is performed (step ST15). More specifically, the control unit 41 obtains a state to be transited from the state management unit 42 in accordance with the voice operation recognition result, and instructs the display generation unit 51 to generate content to be displayed. The display generation unit 51 generates an image signal expressing the content to be displayed in accordance with the instruction from the control unit 41, and transmits the generated image signal to the display projection unit 52. The display projection unit 52 generates an image on the basis of the image signal transmitted from the display generation unit 51, and projects the generated image onto the superimposed display unit 53. In such a way, information as shown in FIG. 3, for example, is displayed on the windshield in a superimposed manner onto an actual scene.

Next, a voice output processing is performed (step ST16). More specifically, the voice generation unit 61 generates voice guidance to be output as a voice in accordance with an instruction from the control unit 41, and transmits the generated voice guidance to the voice output unit 62. As a result, the voice guidance is output from the voice output unit 62. During a search for "nearby restaurants", for example, found restaurant candidates are generated three at a time in the display generation unit 51 and projected onto the windshield, and in addition, voice guidance relating to the found restaurant candidates is performed.

Next, a determination is made as to whether or not the operation is complete (step ST17). More specifically, the control unit 41 obtains a state to be transited from the state management unit 42 and determines whether or not the state to be transited has ended. When it is determined in the step ST17 that the operation is complete, the operation processing is completed. When it is determined in the step ST17 that the operation is not complete, on the other hand, an image input standby state is established (step ST18). More specifically, the control unit 41 transmits an image recognition start command to the image recognition unit 24. As a result, the image recognition unit 24 enters an "image input standby state" awaiting input of an image from the image input unit 21.

Next, a determination is made as to whether or not an image has been input within a predetermined time period (step ST19). More specifically, the image recognition unit 24 determines whether or not an image of an operator movement has been input from the image input unit 21 and a movement position has been determined in the movement position determination unit 23 within a predetermined time period. When it is determined in the step ST19 that an image has not been input within the predetermined time period, the operation processing is completed.

When it is determined in the step ST19 that an image has been input within the predetermined time period, an image detection processing is performed (step ST20). More specifically, the image detection unit 22 detects and extracts a hand image part required for recognition from the image transmitted by the image input unit 21, and transmits the extracted part to the image recognition unit 24. Next, an image recognition processing is performed (step ST21). More specifically, the image recognition unit 24 recognizes a type of movement that has been performed by executing a matching processing between the image transmitted from the image detection unit 22 and recognition patterns stored in advance in a storage unit (not shown in the drawings), and then transmits the recognized results to the control unit 41.

Next, a result processing is performed (step ST22). More specifically, the control unit 41 receives the recognition result from the image recognition unit 24 and executes a processing corresponding to the received recognition result. Next, a display output processing is performed (step ST23). More specifically, the control unit 41 obtains a state to be transited from the state management unit 42 in accordance with the recognized result, and instructs the display generation unit 51 to generate content to be displayed. The display generation unit 51 generates an image signal expressing the content to be displayed in accordance with the instruction from the control unit 41, and transmits the generated image signal to the display projection unit 52. The display projection unit 52 generates an image on the basis of the image signal transmitted from the display generation unit 51, and projects the generated image onto the superimposed display unit 53. Hence, when the recognized results indicate a movement for performing a scroll operation on a selected menu, for example, a menu displayed in a superimposed fashion on the windshield is scroll-displayed.

Next, a voice output processing is performed (step ST24). More specifically, the voice generation unit 61 generates voice guidance to be output as a voice in accordance with an instruction from the control unit 41, and transmits the generated voice guidance to the voice output unit 62. In this way, an voice guidance corresponding to a selected item is output from the voice output unit 62.

Next, a determination is made as to whether or not the operation is complete (step ST25). More specifically, the control unit 41 obtains a state to be transited from the state management unit 42 and determines whether or not the state to be transited has completed. When it is determined in the step ST25 that the operation is complete, the operation processing is completed. When it is determined in the step ST25 that the operation is not complete, on the other hand, the sequence returns to the step ST18, in which the image input standby state is re-established. The processing described above is then repeated.

As described above, with the vehicle operating device in accordance with the first embodiment of this invention, an operation that would be troublesome if performed through a voice operation alone can be performed conveniently and intuitively even during driving without disturbing a driving posture and without shifting a driver's line of sight with a superimposed display on the windshield and a spatial operation.

Note that of the movements recognized by the image recognition unit 24, a movement in which the hand is tilted to the left or right is recognized as a menu scroll operation, a movement in which the fingers are bent is recognized as a determination operation, and so on, for example. However, these movements are merely examples and the present invention is not limited thereto. In another constitution, operations may be performed using a body part other than the hand (the face, eyes, mouth, and so on, for example). Further, the display shown in FIG. 3 is merely an example, and the display location, display shape, display content, and so on may be determined as desired.

Second Embodiment

In the vehicle operating device in accordance with the first embodiment described above, spatial operation recognition is begun by a voice operation, but in the vehicle operating device in accordance with the second embodiment of this invention, spatial operation recognition is begun when a movement performed in a specific position of a space is detected. The constitution of the vehicle operating device in accordance with the second embodiment is identical to the constitution of the vehicle operating device in accordance with the first embodiment, shown in FIG. 1.

Figure 4:
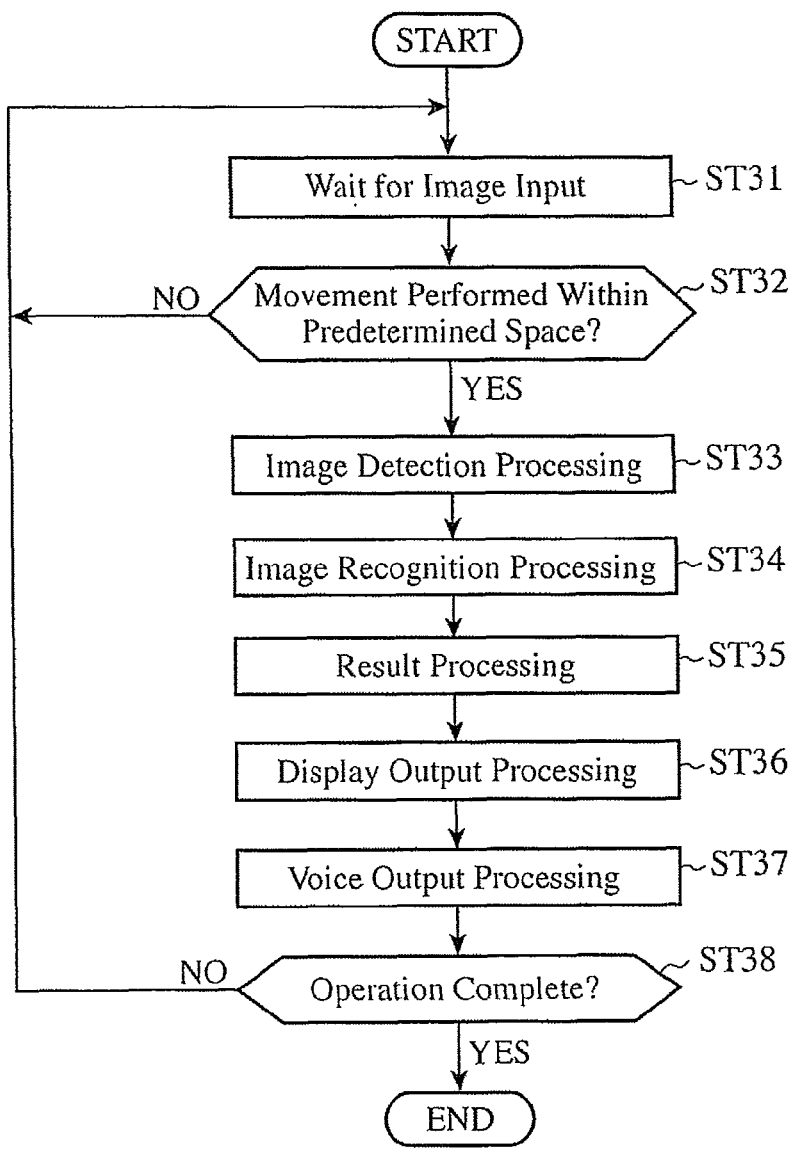
FIG. 4 is a flowchart showing an operation of a vehicle operating device in accordance with a second embodiment of this invention.

Next, an operation of the vehicle operating device in accordance with the second embodiment will be described with reference to a flowchart shown in FIG. 4, centering on an operation processing for realizing a spatial operation.

When a power supply is supplied to the vehicle operating device, the vehicle operating device goes into the image input standby state (step ST31). More specifically, the image recognition unit 24 enters the "image input standby state" awaiting input of an image from the image input unit 21. Next, a determination is made as to whether or not a movement has been performed within a predetermined space (step ST32). More specifically, the image recognition unit 24 determines whether or not an image indicating a movement within a specific space has been input into the movement position determination unit 23. When it is determined in the step ST32 that a movement has not been performed within the predetermined space, the sequence returns to the step ST31, in which the image input standby state is maintained.

When it is determined in the step ST32 that a movement has been performed within the predetermined space, on the other hand, an image detection processing (step ST33), an image recognition processing (step ST34), a result processing (step ST35), display output processing (step ST36), and a voice output processing (step ST37) are executed in sequence, using the movement as a trigger. The processing of the steps ST33 to ST37 is identical to the processing of the steps ST20 to ST24 shown in the flowchart in FIG. 2. Next, a determination is made as to whether or not the operation is complete (step ST38). More specifically, the control unit 41 obtains a state to be transited from the state management unit 42 and determines whether or not the state to be transited has ended. When it is determined in the step ST38 that the operation is complete, the operation processing is completed. When it is determined in the step ST38 that the operation is not complete, on the other hand, the sequence returns to the step ST31, in which the image input standby state is re-established. The processing described above is then repeated.

As described above, with the vehicle operating device in accordance with the second embodiment of this invention, a spatial recognition processing is begun when the operator performs a movement within a specific space, and therefore the operator can issue an explicit instruction to begin a spatial operation at any time, and erroneous movements, in which a spatial recognition processing is begun at an unintended timing, can be prevented.

Note that the operation processing need not be started as soon as the power is supplied, and may be started by the operator at any time and in any state, for example during execution of a certain operation such as a voice recognition operation.

In order to prevent further a situation in which the spatial recognition processing is started erroneously, for example, a condition such that a movement is performed within a certain specific space for a fixed time period, or a condition such that a movement is performed in a certain specific shape within the certain specific space may be added, in the determination processing of the step ST32.

Third Embodiment

In the vehicle operating device in accordance with the third embodiment of this invention, a spatial operation is recognized by recognizing a movement performed within a space three-dimensionally. The constitution of the vehicle operating device in accordance with the third embodiment is identical to the constitution of the vehicle operating device in accordance with the first embodiment, shown in FIG. 1, apart from the function of the movement position determination unit 23. The movement position determination unit 23 determines a three-dimensional position (depth) of the hand within a space, in addition to a two-dimensional position, and transmits a determination result to the image recognition unit 24.

Next, an operation of the vehicle operating device in accordance with the third embodiment will be described with reference to a flowchart shown in FIG. 5. Note that the flowchart of FIG. 5 shows only a spatial operation recognition processing part for recognizing a spatial operation.

In the spatial operation recognition processing, first, a depth detection processing is performed (step ST41). More specifically, the movement position determination unit 23 detects a three-dimensional position, or in other words a depth direction position, of the hand within the space from an image received from the image input unit 21, and transmits the detected three-dimensional position to the image recognition unit 24. Next, an image detection processing is performed (step ST42). More specifically, the image detection unit 22 detects and extracts the hand image part required for recognition from the image transmitted by the image input unit 21 on the basis of color, shape, and so on, and transmits the extracted part to the image recognition unit 24.

Next, an image recognition processing is performed (step ST43). More specifically, the image recognition unit 24 recognizes a sort of movement that has been performed by executing a matching processing between the image transmitted from the image detection unit 22 and a recognition pattern stored in advance in a storage unit (not shown in the drawings), and then transmits the recognized results including depth direction information to the control unit 41. Next, a result processing is performed (step ST44). More specifically, the control unit 41 receives the recognized result from the image recognition unit 24 and executes a processing that corresponds to the received recognized result and reflects the depth direction information.

For example, in accordance with the depth direction information, the control unit 41 executes processings for enlarging or reducing a map screen of the navigation device, changing the volume of music during playback, or expressing a hierarchy along with a depth direction in a case where a search is performed in such a hierarchical structure. Note that in the depth detection processing of the step ST41, the depth may be detected using infrared reflection, a stereoscopic camera and so on, as well as from an image.

As described above, with the vehicle operating device in accordance with the third embodiment of this invention, an operation using the depth direction can be performed by recognizing the depth direction, and moreover, a compound operation combining a planar direction movement and a depth direction movement can be performed.

Fourth Embodiment

In a vehicle operating device in accordance with a fourth embodiment of this invention, a vocabulary uttered for specifying an operation subject is recognized by the voice operation unit 3, and details of the operation content are specified through the spatial operation unit 2. The constitution of the vehicle operating device in accordance with the fourth embodiment is identical to the constitution of the vehicle operating device in accordance with the first embodiment as shown in FIG. 1.

Next, an operation of the vehicle operating device in accordance with the fourth embodiment will be described. Note that the vehicle operating device in accordance with the fourth embodiment performs an identical operation to the vehicle operating device in accordance with the first embodiment except for a limitation whereby the operation subject is specified through the voice operation unit 3 and the details of the operation are specified through the spatial operation unit 2. Therefore, the operation will be described with reference to the flowchart shown in FIG. 2 centering on parts pertaining to the fourth embodiment, and description of parts pertaining to the first embodiment will be omitted or simplified. A case in which a volume changing operation is performed will be described below.

In the operation processing, first, a voice recognition start processing is performed (step ST11). As a result, voice recognition processing is begun and the vehicle operating device enters a standby state awaiting an voice input to be uttered by the operator. Next, a determination is made as to whether or not voice input has been received within a predetermined time period (step ST12). When it is determined in the step ST12 that voice input has not been received within the predetermined time period, the operation processing is completed. When it is determined in the step S12 that voice input has been received within the predetermined time period, on the other hand, a voice recognition processing is performed (step ST13). For example, when the operator utters an operation instruction command such as "change the volume" in the voice input standby state, the uttered voice is recognized in the voice recognition unit 33 and a recognized result is transmitted to the control unit 41.

Next, a result processing is performed (step ST14). More specifically, the control unit 41 learns from the state management unit 42 that a detailed information receptive state is established after the volume changing command, and uses a screen display and voice guidance to indicate a state [awaiting] reception of a detailed volume operation through a spatial operation (steps ST15 and ST16). Next, a determination is made as to whether or not the operation is complete (step ST17). When it is determined in the step ST17 that the operation is complete, the operation processing is completed, and when it is determined that the operation is not complete, the image input standby state is re-established (step ST18).

Next, a determination is made as to whether or not an image has been input within a predetermined time period (step ST19). When it is determined in the step ST19 that an image has not been input within the predetermined time period, the operation processing is completed. When it is determined in the step ST19 that an image has been input within the predetermined time period, on the other hand, an image detection processing is performed (step ST20). More specifically, the operator uses a spatial operation to specify processing details (a degree) with the position, angle, shape, and so on of the hand. For example, the volume is increased by raising the position of the hand, decreased by lowering the position, increased by increasing the tilt angle of the hand, decreased by reducing the angle, or set in accordance with the number of raised fingers. The image detection unit 22 detects and extracts the hand image part described above from the image transmitted by the image input unit 21, and transmits the extracted part to the image recognition unit 24.

Next, an image recognition processing is performed (step ST21). More specifically, the processing details (degree) relating to the operation are specified by recognizing the position, angle, shape, and so on of the hand. Next, a result processing is performed (step ST22). More specifically, the control unit 41 receives a recognized result from the image recognition unit 24 and executes a processing corresponding to the received recognized result, or in other words a volume changing processing corresponding to the recognized result obtained through the spatial operation. Next, an image display (step ST23) and a voice guidance (step ST24) are performed corresponding to the processing results. Next, a determination is made as to whether or not the operation is complete (step ST25). In this case, the volume changing operation is complete, and therefore the operation processing is completed.

As described above, with the vehicle operating device in accordance with the fourth embodiment of this invention, a continuous or analog operation such as volume changing or map scrolling, which is troublesome and difficult to specify using only a voice operation, can be specified intuitively and easily through a spatial operation.

Fifth Embodiment

In a vehicle operating device in accordance with a fifth embodiment of this invention, an image displayed on the display unit 5 is associated with an operation method to be recognized by the spatial operation unit 2. The constitution of the vehicle operating device in accordance with the fifth embodiment is identical to the constitution of the vehicle operating device in accordance with the first embodiment, as shown in FIG. 1, except the function of the display generation unit 51. The display generation unit 51 stores an association table associating "recognition patterns", "menu display shapes", and "menu display images", as shown in FIG. 6, and causes the superimposed display unit 53 to display a menu constituted by an image corresponding to a recognition pattern to be recognized by the image recognition unit 24.

Next, an operation of the vehicle operating device in accordance with the fifth embodiment will be described. Note that the vehicle operating device in accordance with the fifth embodiment performs an identical operation to the vehicle operating device in accordance with the first embodiment except for the menu image displayed on the display unit 5, and therefore only the parts pertaining to the fifth embodiment will be described with reference to the flowchart shown in FIG. 2. A case in which a volume changing operation is performed will be described below.

Figure 2:
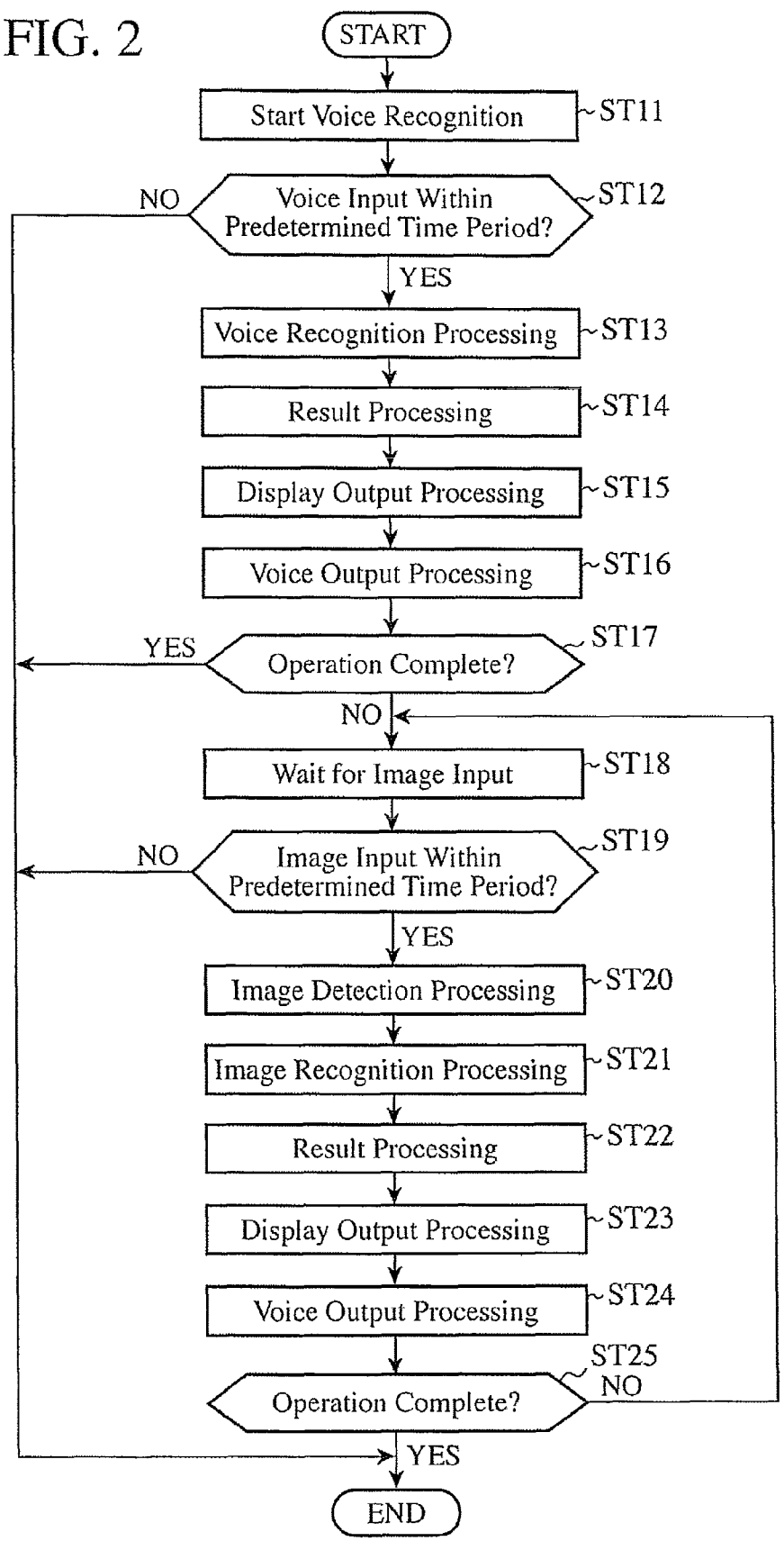
FIG. 2 is a flowchart showing an operation of the vehicle operating device in accordance with the first embodiment of this invention.

In the display output processing executed in the step ST15 and the step ST22 of the flowchart shown in FIG. 2, the display generation unit 51 generates a menu to be displayed in a superimposed fashion on the windshield, but the menu image generated at this time associates with the operation method of the spatial operation. More specifically, the control unit 41 transmits a recognition pattern recognized in the image recognition unit 24 to the display generation unit. The display generation unit 51 obtains a menu display image corresponding to the recognition pattern from the association table shown in FIG. 6, and transmits the obtained menu display image to the display projection unit 52. As a result, a menu image corresponding to the recognition pattern is displayed on the superimposed display unit 53.

For example, in the case where an operation to choose a menu from a plurality of menu candidates displayed in a superimposed manner on the windshield is to be performed by a spatial operation, when a recognition is defined by a spatial operation such that a menu candidate is grabbed, the operator is encouraged to perform a grabbing movement naturally by making the menu display generated in the display generation unit 51 in a ball shape. Further, when it is defined that a recognition is made by a spatial operation such that a menu candidate is pressed, the operator is encouraged to perform a pressing movement naturally by making the menu display generated in the display generation unit 51 in a button shape. Note that the recognition patterns, menu display shapes, menu display images, and associations therebetween shown in FIG. 6 are merely examples, and may be set as the need arises.

As described above, in accordance with the vehicle operating device of the fifth embodiment of this invention, menus can be displayed: for example, a pressing spatial operation is performed when the menu display is button-shaped, while a grabbing spatial operation is performed when the menu display is ball-shaped; therefore the operator can grasp the operation method of the spatial operation intuitively. As a result, operations can be made easy to understand.

Sixth Embodiment

In a vehicle operating device in accordance with a sixth embodiment of this invention, icons are displayed using images expressing spatial operations that can be recognized by the spatial operation unit. The constitution of the vehicle operating device in accordance with the sixth embodiment is identical to the constitution of the vehicle operating device in accordance with the first embodiment, shown in FIG. 1, apart from the function of the display generation unit 51. The display generation unit 51 stores an association table associating "recognition patterns" and "icon display images", such as that shown in FIG. 7, and causes the superimposed display unit 53 to display a menu constituted by an icon corresponding to a recognition pattern recognized by the image recognition unit 24.

Next, an operation of the vehicle operating device in accordance with the sixth embodiment will be described. Note that the vehicle operating device in accordance with the sixth embodiment performs an identical operation to the vehicle operating device in accordance with the first embodiment except for the fact that an icon is displayed on the display unit 5 during image recognition, and therefore only the parts pertaining to the sixth embodiment will be described with reference to the flowchart shown in FIG. 2. A case in which a volume changing operation is performed will be described below.

During execution of the image recognition processing in the step ST21 of the flowchart shown in FIG. 2, the control unit 41 transmits the recognition pattern recognized in the image recognition unit 24 to the display generation unit. The display generation unit 51 obtains an icon display image corresponding to the recognition pattern from the association table shown in FIG. 7, and transmits the obtained icon display image to the display projection unit 52. As a result, an icon corresponding to the recognition pattern recognized by the image recognition unit 24 is displayed by the superimposed display unit 53 so as to be superimposed onto an actual scene on the windshield.

For example, when a spatial operation in which the hand is waved to the left and right is recognizable, a moving image icon in which a hand waves to the left and right is displayed, and thus the operator is informed of the spatial operation that can be recognized at present. Note that when a plurality of spatial operations can be performed, a plurality of icons may be displayed simultaneously.

As described above, with the vehicle operating device in accordance with the sixth embodiment, the operator can learn the operation method of a spatial operation that can be received at present by looking at an icon, and therefore operations can be understood easily when the operation methods of the spatial operations that can be recognized by the spatial operation unit 2 vary according to the situation.

Seventh Embodiment

Figures 8, 10:
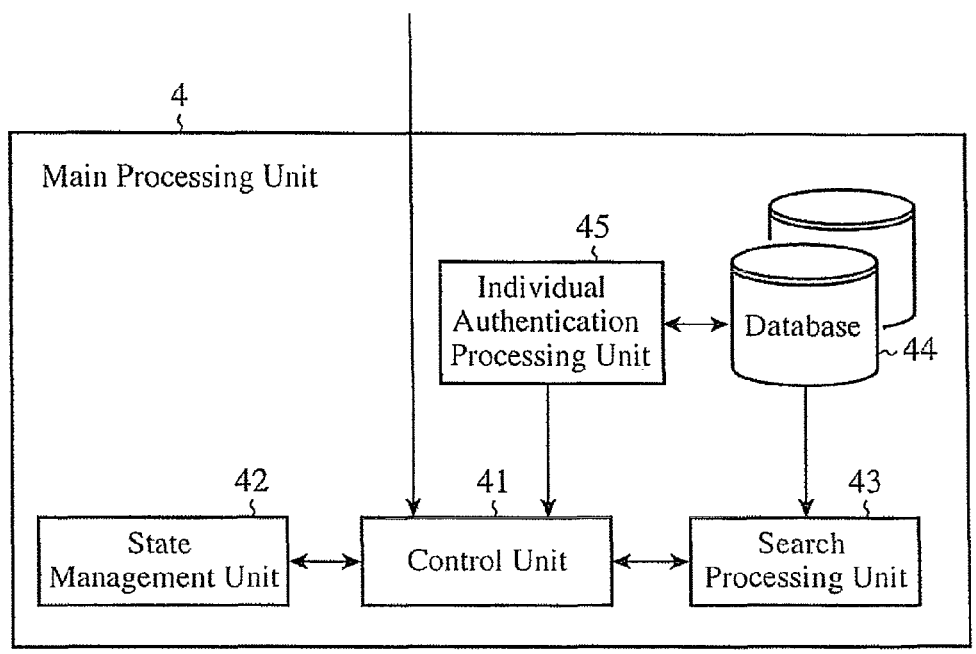
FIG. 8 is a block diagram showing a constitution of a main processing unit in a vehicle operating device in accordance with a seventh embodiment of this invention.
FIG. 10 is a view showing examples of menu items used in a vehicle operating device in accordance with an eighth embodiment of this invention.

In a vehicle operating device in accordance with a seventh embodiment of this invention, a spatial operation is recognized from the position of a spatial operation corresponding to a person authenticated by individual authentication. The constitution of the vehicle operating device in accordance with the seventh embodiment is identical to the constitution of the vehicle operating device in accordance with the first embodiment, shown in FIG. 1, apart from the constitution of the main processing unit 4. As shown in FIG. 8, the main processing unit 4 differs from the main processing unit in accordance with the first embodiment in that an individual authentication processing unit 45 is added and individual authentication information is stored in the database 44.

The individual authentication unit 45 authenticates an individual serving as the operator. Various well-known methods, such as a method of selecting an individual using an HMI (Human Machine Interface) on a monitor screen, an authentication method using an IC card, and an authentication method employing fingerprint authentication, face recognition, and so on, for example, may be used as the individual authentication method employed by the individual authentication processing unit 45. An authentication result obtained by the individual authentication processing unit 45 is transmitted to the control unit 41.

Next, an operation of the vehicle operating device in accordance with the seventh embodiment, constituted as described above, will be described with reference to a flowchart shown in FIG. 9, centering on an operation processing for realizing a spatial operation.

In the operation processing, first, individual authentication is performed (step ST51). More specifically, the individual authentication processing unit 45 performs individual authentication on the person acting as the operator by referring to the database 44, and transmits an authentication result to the control unit 41. Next, a set recognition mode is obtained (step ST52). More specifically, the control unit 41 obtains a recognition mode (a relative mode or an absolute mode) set by the individual as a result of the individual authentication performed in the step ST51. The recognition mode may be set and modified for each individual. The recognition mode may be extracted from personal information stored in the database 44 for each individual. Note that the recognition mode may also be obtained directly by the individual authentication processing unit 45 from an IC card or the like.

Next, a recognition standby state is established (step ST53). The processing of the step ST53 is identical to the processing of the step ST18 shown in the flowchart of FIG. 2. Next, a determination is made as to whether or not an image has been input within a predetermined time period (step ST54). The processing of the step ST54 is identical to the processing of the step ST19 shown in the flowchart of FIG. 2. When it is determined in the step ST54 that an image has not been input within the predetermined time period, the operation processing is completed.

When it is determined in the step ST54 that an image has been input within the predetermined time period, on the other hand, a movement position determination processing is performed (step ST55). More specifically, the movement position determination unit 23 determines the movement position of the hand within a space, and transmits a determination result to the image recognition unit 24. Then, an image detection processing (step ST56), an image recognition processing (step ST57), and a result processing (step ST58) are performed in sequence. The processings of the steps ST56 to ST58 is identical to the processings of the steps ST20 to ST22 as shown in the flowchart of FIG. 2, respectively.

Next, a selection position determination is performed (step ST59). When the recognition mode obtained in the step ST52 is a relative mode, a permanently fixed location is determined as a selection start position in the step ST59, regardless of the movement position determined in the step ST55. For example, a central item is always selected from the menu regardless of whether the operation position is located on the right or the left. When the operation continues without completion, an initial spatial position is set as a basic position, and the menu to be selected is modified by means of a relative positional movement therefrom. When the recognition mode obtained in the step ST52 is the absolute mode, on the other hand, the selection start position is determined on the basis of the movement position determined in the step ST55. For example, when the operation position is located on the right, the operation begins in a state where an item on the right end is selected, and when the operation position is located on the left, the operation begins in a state where an item on the left end is selected.

Next, a display output processing (step ST60) and a voice output processing (step ST61) are executed in sequence. The processings of the steps ST60 and ST61 is identical to the processings of the steps ST23 and ST24 as shown in the flowchart of FIG. 2, respectively. Next, a determination is made as to whether or not the operation is complete (step ST62). More specifically, the control unit 41 obtains a state to be transited from the state management unit 42 and determines whether or not the state to be transited is complete. When it is determined in the step ST62 that the operation is complete, the operation processing is completed. When it is determined in the step ST62 that the operation is not complete, on the other hand, the sequence returns to the step ST54, in which the image input standby state is re-established. The processing described above is then repeated.

As described above, with the vehicle operating device in accordance with the seventh embodiment of this invention, recognition can be performed in a relative mode, and therefore operations can be performed without being affected by differences in the individual seating positions, dominant arms, and so on of operators. Moreover, recognition can also be performed in an absolute mode, and therefore the operator can perform operations intuitively based on a fixed position.

Furthermore, the operator can choose between the relative mode and the absolute mode, and therefore operations can be performed more conveniently according to their personal preferences.

Note that in the absolute mode, the position in which a movement performed in a space is recognized may be modified according to the individual. With this constitution, an optimum position can be set in relation to the operator regardless of differences in the seating position, hand length, and so on of the operator, and as a result, operations can be performed in a comfortable posture without erroneous recognition.

Eighth Embodiment

In a vehicle operating device in accordance with an eighth embodiment of this invention, when the operator performs an operation to select a menu item, a voice guidance corresponding to the selected menu item is performed. The constitution of the vehicle operating device in accordance with the eighth embodiment is identical to the constitution of the vehicle operating device in accordance with the first embodiment, shown in FIG. 1, apart from the fact that menu items are stored in the database 44. As shown in FIG. 10, various information such, including names, locations, addresses, and detailed information, is associated with the menu items stored in the database 44.

Next, an operation of the vehicle operating device in accordance with the eighth embodiment will be described. Note that the vehicle operating device in accordance with the eighth embodiment performs an identical operation to the vehicle operating device in accordance with the first embodiment except for the fact that voice guidance content is specified, and therefore only the parts pertaining to the eighth embodiment will be described with reference to the flowchart shown in FIG. 2.

In the image input standby state (step ST18), the operator performs an operation to select a single item from the menu using a spatial operation, and when the intent of the operator is determined in the step ST19, an image detection processing (step ST20) and an image recognition processing (step ST21) are performed in succession, whereby a result indicating that the menu is selected is obtained (step ST22). Once the menu has been selected, information relating to the corresponding menu item is obtained from the database 44, and in the voice output processing (step ST24), this information is read out by voice. Here, the content to be read out may simply be information relating to a name or a location, or may include a guidance describing detailed information relating to a facility.

As described above, with the vehicle operating device in accordance with the eighth embodiment of this invention, feedback by the voice guidance is performed upon selection of a menu item, and therefore the operator can grasp that an operation has been performed without looking at the display. Moreover, detailed information relating to the selected item can be learned from the voice.

Ninth Embodiment

In a vehicle operating device in accordance with a ninth embodiment of this invention, when the operator performs a specific spatial operation, a voice guidance corresponding to the spatial operation is performed.

The constitution of the vehicle operating device in accordance with the ninth embodiment is identical to the constitution of the vehicle operating device in accordance with the first embodiment, shown in FIG. 1, apart from the function of the image recognition unit 24. In the image recognition unit 24, a voice guidance read-out movement is defined as a recognition pattern corresponding to a recognizable spatial operation.

Next, an operation of the vehicle operating device in accordance with the ninth embodiment will be described. Note that the vehicle operating device in accordance with the ninth embodiment performs an identical operation to the vehicle operating device in accordance with the first embodiment except for the fact that voice guidance content is concretized, and therefore only the parts pertaining to the ninth embodiment will be described with reference to the flowchart shown in FIG. 2.

In the image input standby state (step ST18), the operator performs a movement instructing voice guidance read-out using a spatial operation, and when the intent of the operator is determined in the step ST19, an image detection processing (step ST20) is performed, followed by an image recognition processing (step ST21). In the image recognition processing, the image recognition unit 24 recognizes the movement instructing voice guidance read-out, and transmits a voice guidance read-out request to the control unit 41. Upon reception of the voice guidance read-out request, the control unit 41 executes a result processing (step ST22). More specifically, the control unit 41 obtains the current state and the selected item from the state management unit 42, obtains information corresponding to the selected item from the database 44, and transmits the obtained information to the voice generation unit 61. A display output processing (step ST24) is then performed, followed by a voice output processing (step ST24). In the voice output processing, the information obtained from the database 44 is output as voice guidance.

As described above, with the vehicle operating device in accordance with the ninth embodiment of this invention, when the operator wishes to know detailed information, he can listen to the voice guidance at any time by performing a specific spatial operation.

Tenth Embodiment

Figure 11:
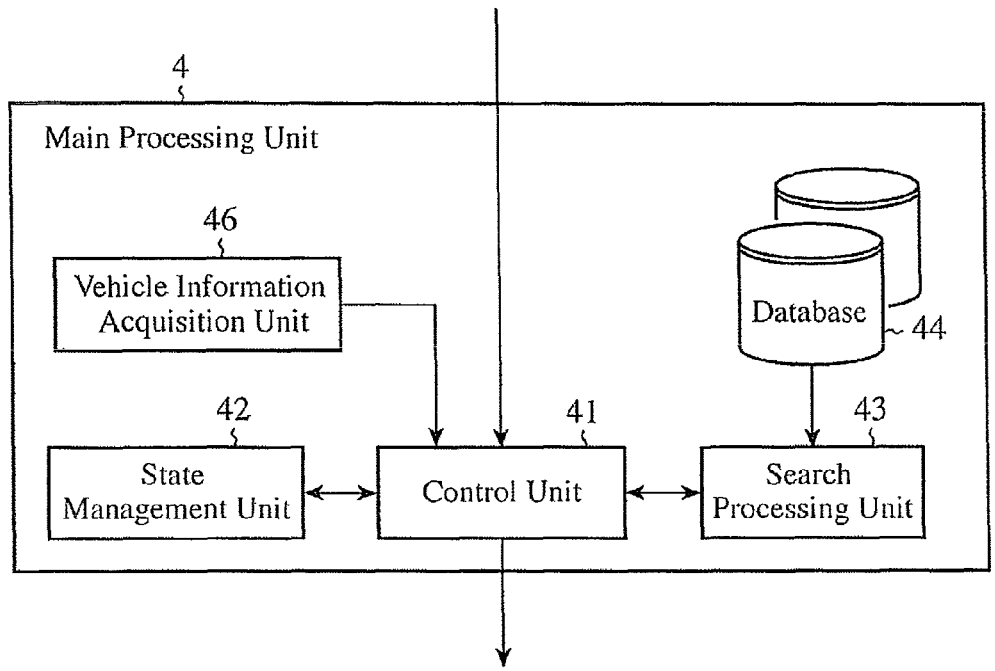
FIG. 11 is a block diagram showing a constitution of a main processing unit in a vehicle operating device in accordance with a tenth embodiment of this invention.

In a vehicle operating device in accordance with a tenth embodiment of this invention, the number of displayed items and the display content displayed on the display unit 5 are modified in accordance with driving conditions. The constitution of the vehicle operating device in accordance with the tenth embodiment is identical to the constitution of the vehicle operating device in accordance with the first embodiment, shown in FIG. 1, apart from the constitution of the main processing unit 4. As shown in FIG. 11, the main processing unit 4 differs from the main processing unit in accordance with the first embodiment in that a vehicle information acquisition unit 46 is added. The vehicle information acquisition unit 46 obtains vehicle information from the navigation device. The vehicle information includes location information such as a current location or a destination, road information relating to the road to be traveled ahead, and operating information relating to steering wheels, wipers, and so on, obtained from a vehicle control unit.

Figure 12:
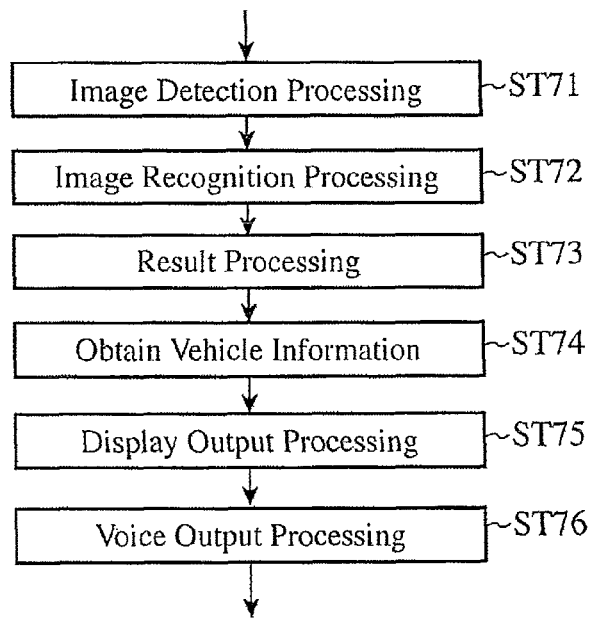
FIG. 12 is a flowchart showing an operation of the vehicle operating device in accordance with the tenth embodiment of this invention.

Next, an operation of the vehicle operating device in accordance with the tenth embodiment, constituted as described above, will be described with reference to a flowchart shown in FIG. 12. Note that the flowchart of FIG. 12 shows only parts relating to a spatial operation recognition processing for recognizing a spatial operation.

In the spatial operation recognition processing, an image detection processing (step ST71), an image recognition processing (step ST72), and a result processing (step ST73) are executed in sequence. The processings of the steps ST71 to ST73 is identical to the processings of the steps ST20 to ST22 shown in the flowchart of FIG. 2. Next, vehicle information is obtained (step ST74). More specifically, the control unit 41 obtains the vehicle information from the vehicle information acquisition unit 46.

Next, a display output processing is performed (step ST75). More specifically, the control unit 41 obtains a state to be transited from the state management unit 42 in accordance with the recognized result, and instructs the display generation unit 51 to generate content to be displayed. At this time, when the vehicle information obtained in the step ST74 indicates a specific condition in which the driving load of the operator is considered to be high, the control unit 41 instructs the display generation unit 51 to simplify the display content, for example by reducing the number of displayed items and/ or making the display content simpler and easier to see. Examples of situations to be considered as a driving load for the operator include: a case in which travel is underway in the vicinity of an intersection from a travel location; a case in which a curve exists on the travel route ahead; a case in which the steering wheel is turned; and a case in which the wipers are activated. The display generation unit 51 generates an image signal expressing the content to be displayed in accordance with the instruction from the control unit 41, and transmits the generated image signal to the display projection unit 52. The display projection unit 52 generates an image on the basis of the image signal transmitted from the display generation unit 51, and projects the generated image onto the superimposed display unit 53. A voice output processing is then performed (step ST76).

As described above, with the vehicle operating device in accordance with the tenth embodiment of this invention, when the driving load is high, the number of displayed items is reduced and the display content is made simpler and easier to see. As a result, the operating load of the operator can be reduced.

Eleventh Embodiment

Figure 13:
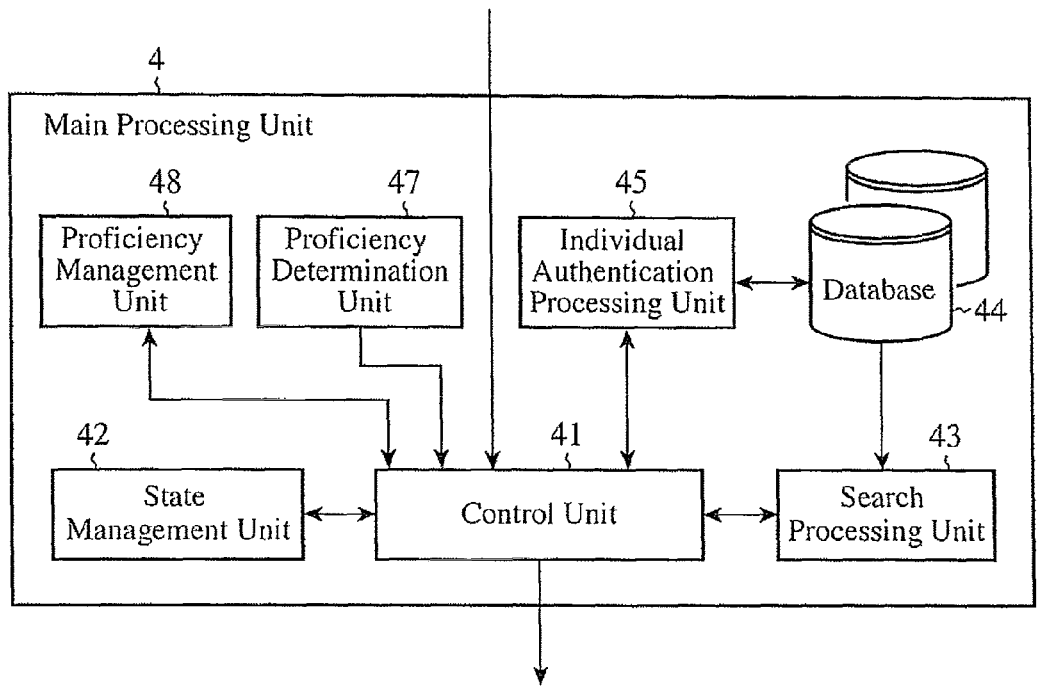
FIG. 13 is a block diagram showing a constitution of a main processing unit in a vehicle operating device in accordance with an eleventh embodiment of this invention.

In a vehicle operating device in accordance with an eleventh embodiment of this invention, the operation method of the spatial operation or the content displayed on the display unit 5 is varied in accordance with the spatial operation proficiency of the operator. The constitution of the vehicle operating device in accordance with the eleventh embodiment is identical to the constitution of the vehicle operating device in accordance with the first embodiment, shown in FIG. 1, apart from the constitution of the main processing unit 4. As shown in FIG. 13, the main processing unit 4 differs from the main processing unit in accordance with the seventh embodiment (see FIG. 8) in that a proficiency determination unit 47 and a proficiency management unit 48 are added.

The proficiency determination unit 47 determines the spatial operation proficiency of the operator. The proficiency is determined on the basis of use frequency, use time, the number of erroneous recognitions and erroneous operations, and so on. A determination result generated by the proficiency determination unit 47 is transmitted to the control unit 41. The proficiency management unit 48 manages the proficiency levels of a plurality of operators and operation levels corresponding to the proficiency levels. The content of the proficiency management unit 48 is accessed by the control unit 41.

Figure 14:
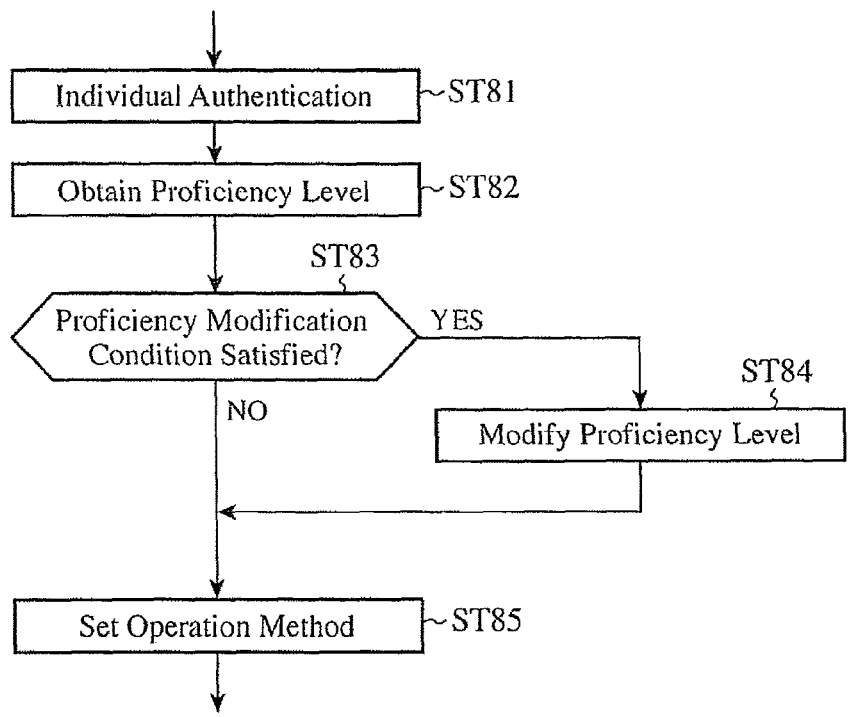
FIG. 14 is a flowchart showing an operation of the vehicle operating device in accordance with the eleventh embodiment of this invention.

Next, an operation of the vehicle operating device in accordance with the eleventh embodiment, constituted as described above, will be described with reference to a flowchart shown in FIG. 14. Note that the flowchart of FIG. 14 shows only parts relating to proficiency processing for processing a proficiency level. The proficiency processing may be executed immediately after power is supplied, for example, or at another desired timing.

In the proficiency processing, first, individual authentication is performed (step ST81). The processing of the step ST81 is identical to the processing of the step ST51 shown in the flowchart of FIG. 9. Through the processing of the step ST81, the operator is specified. Next, a proficiency level is obtained (step ST82). The control unit 41 obtains the proficiency level of the operator specified in the step ST81 from the proficiency management unit 48.

Next, a determination is made as to whether or not a proficiency modification condition is satisfied (step ST83). More specifically, the control unit 41 obtains a proficiency level determination result for each operator from the proficiency determination unit 47, and determines whether or not a condition for increasing the proficiency level is satisfied. When it is determined in the step ST83 that the proficiency modification condition is satisfied, the proficiency level is modified (step ST84). More specifically, the control unit 41 performs automatic proficiency setting to increase the proficiency levels of the respective operators, which are managed by the proficiency management unit 48. The sequence then advances to a step ST85. Note that a constitution in which the operator sets his/her own preferred proficiency level in the proficiency management unit 48 may be employed. When it is determined in the step ST83 that the proficiency modification condition is not satisfied, the sequence advances to the step ST85.

In the step ST85, the operation method is set. The proficiency management unit 48 holds operating methods corresponding to the proficiency levels, and the operator modifies the operations that can be performed by the operator in accordance with the set proficiency level. For example, when the proficiency level is "1", the menu is set at two choices, when the proficiency level is "2", the menu is increased to three choices, and when the proficiency level is "3", instrument operations such as volume changing also become possible. Note that the content displayed on the display unit 5 as well as the operation method may be modified in accordance with the proficiency level. The proficiency processing is then completed.

As described above, with the vehicle operating device in accordance with the eleventh embodiment of this invention, the operation method or display content can be modified in accordance with the spatial operation proficiency level of the operator such that when the operator is not accustomed to performing spatial operations, simple operation methods and displays are set, and as the proficiency of the operator improves, the operation method level is raised, for example. Thus, everyone from beginners to experts can perform appropriate operations.

Further, by performing individual authentication and managing the proficiency levels individually, an appropriate operation level can be provided to the operator even when a plurality of operators exists.

Twelfth Embodiment

In a vehicle operating device in accordance with a twelfth embodiment of this invention, a voice operation is started by a spatial operation. The constitution of the vehicle operating device in accordance with the twelfth embodiment is identical to the constitution of the vehicle operating device in accordance with the first embodiment, shown in FIG. 1, except the function of the image recognition unit 24. In the image recognition unit 24, a movement for starting a voice operation is defined as a recognition pattern which is a recognizable spatial operation.

Figure 15:
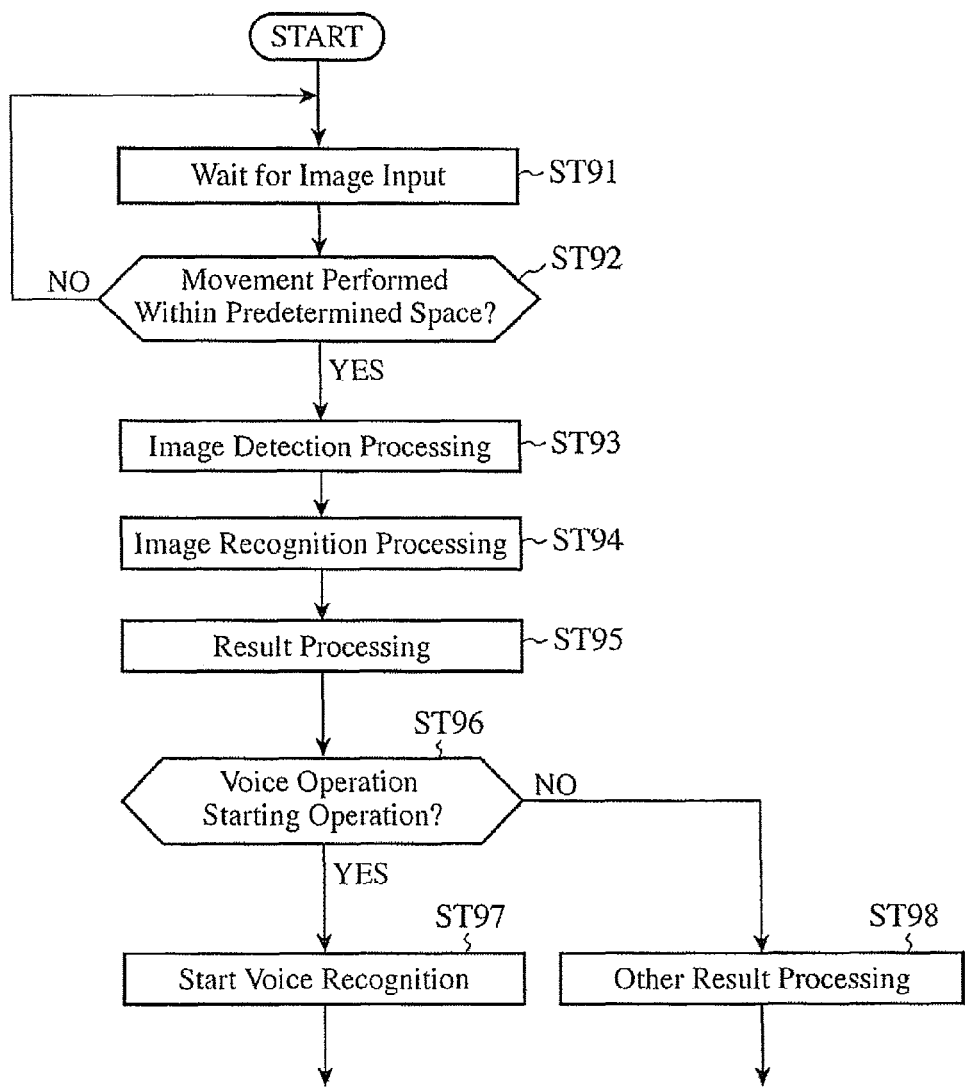
FIG. 15 is a flowchart showing an operation of a vehicle operating device in accordance with a twelfth embodiment of this invention.

Next, an operation of the vehicle operating device in accordance with the twelfth embodiment, constituted as described above, will be described with reference to a flowchart shown in FIG. 15.

When a power supply is introduced, the vehicle operating device enters the image input standby state (step ST91). In the step ST91, a determination is made as to whether or not a movement has been performed within a predetermined space (step ST92). When it is determined in the step ST92 that a movement has not been performed within the predetermined space, the sequence returns to the step ST91, in which the image input standby state is maintained. When it is determined in the step ST92 that a movement has been performed within the predetermined space, on the other hand, this determination is used as a trigger to execute image detection processing (step ST93), image recognition processing (step ST94), and result processing (step ST95) in sequence. The processing of the steps ST91 to ST95 is identical to the processing of the steps ST18 to ST22 shown in the flowchart of FIG. 2.

Next, a determination is made as to whether or not a voice operation starting operation has been performed (step ST96). More specifically, the control unit 41 receives a recognized result from the image recognition unit 24, and determines whether or not the recognized result indicates a voice operation starting movement. When it is determined in the step ST96 that the movement is a voice operation starting operation, voice recognition is begun (step ST97). More specifically, the control unit 41 issues a request to the voice recognition unit 33 to begin a voice operation, whereupon the voice input unit 31 enters a voice input standby state. When it is determined in the step ST96 that the movement is not a voice operation starting operation, on the other hand, other result processing is performed (step ST98).

As described above, according to the vehicle operating device in accordance with the twelfth embodiment of this invention, the start of a voice operation is indicated by a spatial operation, and therefore the need to provide a switch to indicate the start of a voice recognition operation utterance is eliminated.

Thirteenth Embodiment

In a vehicle operating device in accordance with a thirteenth embodiment of this invention, voice recognition is continued when the hand of the operator is moving. The constitution of the vehicle operating device in accordance with the thirteenth embodiment is identical to the constitution of the vehicle operating device in accordance with the first embodiment, shown in FIG. 1, apart from the function of the image recognition unit 24. In the image recognition unit 24, similarly to the vehicle operating device in accordance with the twelfth embodiment described above, a movement for starting a voice operation is defined as a recognition pattern which is a recognizable spatial operation.

Figure 16:
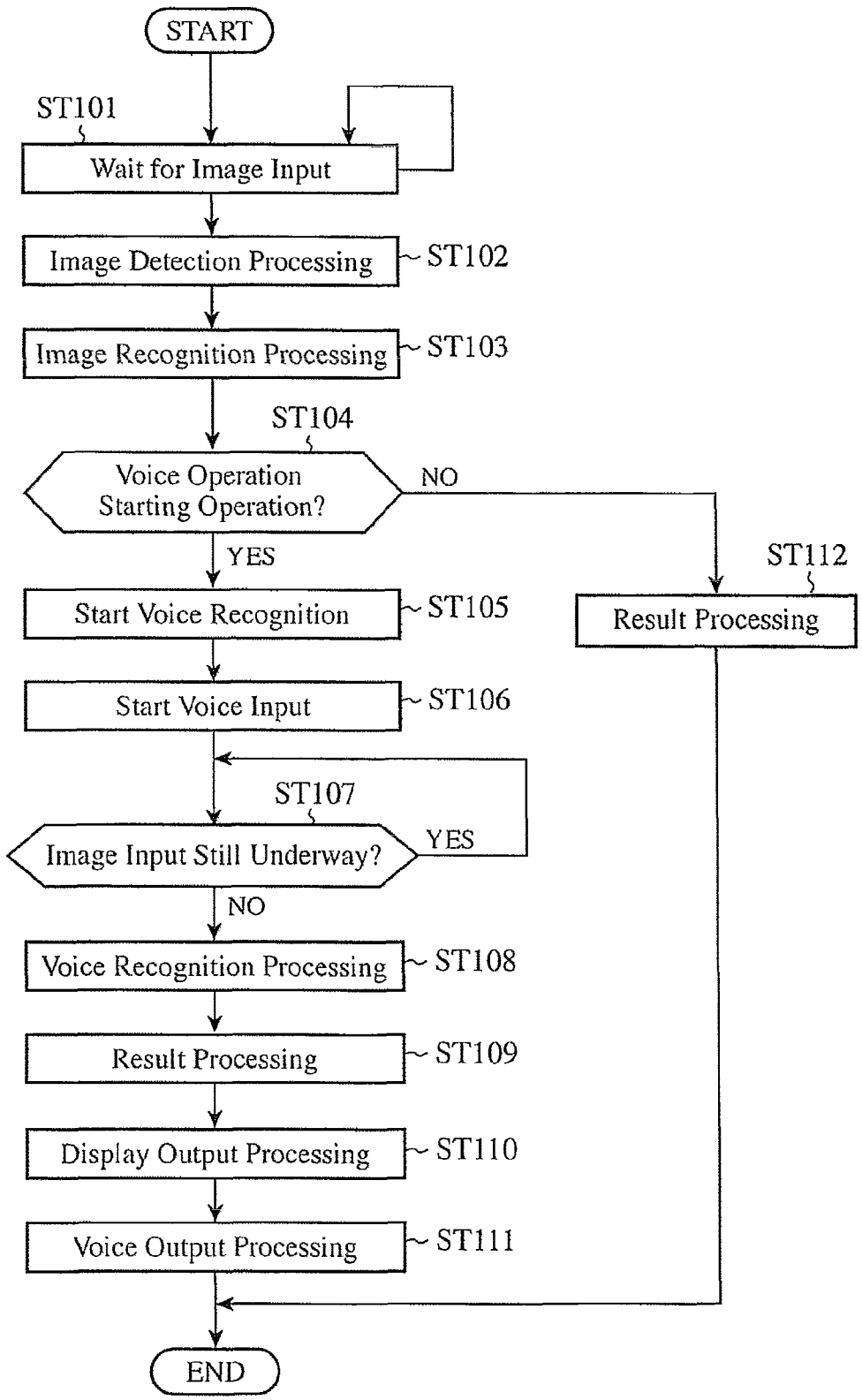
FIG. 16 is a flowchart showing an operation of a vehicle operating device in accordance with a thirteenth embodiment of this invention.

Next, an operation of the vehicle operating device in accordance with the thirteenth embodiment of this invention, constituted as described above, will be described. The operation of the vehicle operating device can be summarized as follows. When the image recognition unit 24 recognizes that a movement is maintained in a specific space in the image detection unit 22 and the movement position determination unit 23, voice recognition processing is performed, and when the movement is not maintained within the specific space any longer, the voice recognition processing is completed. This operation will now be described specifically with reference to a flowchart shown in FIG. 16.

When a power is supplied, the vehicle operating device enters the image input standby state (step ST101). When it is determined in the step ST101 that an image has not been input, the image input standby state is maintained in the step ST101. When it is determined in the step ST101 that an image has been input, on the other hand, this determination is used as a trigger to execute image detection processing (step ST102) and image recognition processing (step ST103) in sequence. The processing of the steps ST102 and ST103 is identical to the processing of the steps ST20 and ST21 shown in the flowchart of FIG. 2, respectively.

Next, a determination is made as to whether or not a voice operation starting instruction has been issued (step ST104). When it is determined in the step ST104 that a voice operation starting instruction has been issued, voice recognition is begun (step ST105). More specifically, the control unit 41 issues a request to the voice recognition unit 33 to begin a voice operation. Next, voice input is begun (step ST106). More specifically, the voice input unit 31 enters the voice input standby state in response to a voice operation start request from the voice recognition unit 33.

Next, a determination is made as to whether or not an image input is continued (step ST107). More specifically, the image recognition unit 24 determines whether or not the image input is continued. When it is determined in the step ST107 that image input is continued, the step ST107 is repeated. Hence, voice input is continued in the voice recognition unit 33 for the duration of image input.

When it is determined in the step ST107 that the image input is not continued any longer, voice recognition processing is executed (step ST108). More specifically, the voice recognition unit 33 completes a voice input and performs recognition processing. Next, processing is performed on the recognized result obtained in the step ST108 (step ST109). Next, display output processing (step ST110) and voice output processing (step ST111) are performed in sequence, whereupon the processing is completed. When it is determined in the step ST104 that a voice operation starting instruction has not been issued, result processing is performed (step ST112), whereupon the processing is completed.

As described above, with the vehicle operating device in accordance with the thirteenth embodiment of this invention, the operator can clarify an utterance interval extending from the start to the end of an utterance, and therefore voice utterances can be extracted easily even in noisy conditions, enabling a reduction in erroneous recognition.

Fourteenth Embodiment

In a vehicle operating device in accordance with a fourteenth embodiment of this invention, a voice recognition dictionary is switched according to a spatial operation performed by the operator. First, as a typical voice recognition mechanism, the voice recognition dictionary 32 to be utilized in a voice recognition is divided into a plurality of ones according to vocabulary types, and then every time the voice recognition is performed, the employed dictionary is switched, thereby modifying or altering recognizable vocabularies. For example, when an address search is performed, an address dictionary is activated from among the voice recognition dictionaries 32 before voice recognition is performed such that only address vocabularies are recognized and other vocabularies are not recognized. In so doing, erroneous recognitions can be reduced.

However, to switch the voice recognition dictionary, voice operations must be performed in a hierarchical structure. For example, the phrase "address search" must be uttered before the address dictionary is activated so that only address vocabularies can be recognized, and therefore an operation cannot be achieved through a single utterance, which is troublesome. Hence, in the vehicle operating device in accordance with the fourteenth embodiment, the operator can specify a recognition dictionary through a single utterance by performing a spatial operation during the utterance. For example, the address dictionary is activated by performing a spatial operation in which the hand is tilted toward the right, and a music dictionary is activated by performing a spatial operation in which the hand is tilted toward the left.

The constitution of the vehicle operating device in accordance with the fourteenth embodiment is identical to the constitution of the vehicle operating device in accordance with the first embodiment, shown in FIG. 1, apart from the function of the image recognition unit 24. The image recognition unit 24 holds an association table defining voice recognition dictionaries in accordance with image recognized results, as shown in FIG. 17.

Next, an operation of the vehicle operating device in accordance with the fourteenth embodiment of this invention, constituted as described above, will be described with reference to a flowchart shown in FIG. 18.

First, voice input start processing is performed (step ST121). More specifically, when a trigger such as pressing an utterance button, for example, is input, the voice recognition unit 33 begins voice recognition, whereupon the voice input standby state (step ST122) and the image input standby state (step ST127) are established. More specifically, the control unit 41 issues a request to the voice recognition unit 33 to begin voice input, whereupon the voice recognition unit 33 enters a standby state awaiting voice recognition from the voice input unit 31. Further, the control unit 41 issues a request to the image recognition unit 24 to begin image recognition, whereupon the image recognition unit 24 enters a standby state awaiting image input from the image input unit 21.

When a spatial operation image is input in the image input standby state of the step ST127, image detection processing (step ST128) and image recognition processing (step ST129) are executed in sequence. The processing of the steps ST128 and ST129 is identical to the processing of the steps ST20 and ST21, respectively, shown in the flowchart of FIG. 2.

Next, recognition dictionary switching processing is performed (step ST130). More specifically, the image recognition unit 24 obtains the voice recognition dictionary corresponding to the recognized result from the association table shown in FIG. 17 and transmits the obtained dictionary to the control unit 41. The control unit 41 identifies the voice recognition dictionary received from the image input unit 21 and issues a request to the voice recognition unit 33 to switch the recognition dictionary to be used. In response to this request, the voice recognition unit 33 switches to the recognition dictionary to be used. Thereafter, the switched recognition dictionary is used for voice recognition.

When voice input occurs in the voice input standby state of the step ST122, voice recognition processing is performed (step ST124). More specifically, the voice recognition unit 33 performs recognition processing on the input voice using the switched recognition dictionary. Next, result processing corresponding to the voice recognized result (step ST123), display output processing (step ST125), and voice output processing (step ST126) are performed in sequence.

Note that the association table associating spatial operation recognition results and voice recognition dictionaries as shown in FIG. 17 is merely one example, and may be created using any desired combinations. Further, the operation method of the spatial operation for specifying a recognition dictionary is arbitrary, and any specification methods based on the position, number of fingers, and so on may be used instead.

As described above, with the vehicle operating device in accordance with the fourteenth embodiment of this invention, the voice recognition dictionary can be switched using a spatial operation, and therefore the operator can ensure that intended vocabularies will be recognized through a single utterance and a single spatial operation. As a result, erroneous recognition is reduced, leading to an improvement in operability.

INDUSTRIAL APPLICABILITY

As described above, the vehicle operating device according to this invention enables operations to be performed intuitively, easily, and conveniently even during driving without disturbing a driving posture and without shifting a driver's line of sight, and is therefore suitable for operating a navigation device or the like.

The invention claimed is:

1. A vehicle operating device, comprising:
 a voice operation unit for recognizing an uttered voice and outputting a voice recognition result;
 a spatial operation unit for recognizing a movement performed within a predetermined space and outputting a spatial recognition result;
 a main processing unit for executing a specific processing corresponding to said voice recognition result and executing a separate specific processing corresponding to said spatial recognition result;
 a display unit for displaying an image generated in accordance with an instruction from said main processing unit, said image being superimposed on an actual scene that can be viewed through a windshield; and
 an individual authentication processing unit for authenticating an individual,
 wherein said main processing unit causes said display unit to display a menu corresponding to said voice recognition result, and executes processing corresponding to said spatial recognition result to select a single item from said menu, and
 said spatial operation unit obtains a recognition mode set in relation to said individual authenticated by said individual authentication unit, and when an item displayed on said display unit is selected, said spatial operation unit recognizes said movement performed within space by a relative position thereof when said recognition mode is a relative mode, and by an absolute position thereof when said recognition mode is an absolute mode.

2. The vehicle operating device according to claim 1, wherein said spatial operation unit begins spatial operation recognition by detecting a movement performed in a specific position of said space.

3. The vehicle operating device according to claim 1, wherein said spatial operation unit recognizes said movement performed in said space three-dimensionally.

4. The vehicle operating device according to claim 1, wherein said voice operation unit recognizes an utterance of a vocabulary as an operation subject,
 said spatial operation unit recognizes said movement performed within said space, and
 said main processing unit causes said display unit to display information based on said voice recognition result, determines operation content detail on the basis of said spatial recognition result, and then executes processing corresponding to a result of said determination.

5. The vehicle operating device according to claim 1, wherein said display unit generates an image conforming to an operation method recognized by said spatial operation unit in accordance with an instruction from said main processing unit, and displays said generated image, said image being superimposed on said actual scene that can be viewed through said windshield.

6. The vehicle operating device according to claim 1, wherein said display unit displays an icon using an image expressing a spatial operation that can be recognized in said spatial operation unit.

7. The vehicle operating device according to claim 1, wherein when an item displayed on said display unit is selected, said spatial operation unit recognizes said movement performed within said space by a relative position thereof.

8. The vehicle operating device according to claim 1, wherein when an item displayed on said display unit is selected, said spatial operation unit recognizes said movement performed within said space by an absolute position thereof.

9. The vehicle operating device according to claim 1, wherein when said recognition mode is said absolute mode, said spatial operation unit modifies a position in which said movement performed within said space is recognized in accordance with said individual authenticated by said individual authentication unit.

10. The vehicle operating device according to claim 1, further comprising a voice processing unit for performing voice guidance relating to an item displayed on said display unit when said item is selected using said spatial operation unit.

11. The vehicle operating device according to claim 1, further comprising a voice processing unit for performing voice guidance corresponding to a spatial operation when said spatial operation is recognized by said spatial operation unit.

12. The vehicle operating device according to claim 1, wherein said main processing unit comprises a vehicle information acquisition unit for obtaining vehicle information, and modifies a content to be displayed on said display unit in accordance with said vehicle information obtained by said vehicle information acquisition unit.

13. The vehicle operating device according to claim 1, wherein said main processing unit comprises a proficiency determination unit for determining a spatial operation proficiency level, and modifies a spatial operation method to be recognized by said spatial operation unit or a content to be displayed on said display unit in accordance with said proficiency level determined by said proficiency determination unit.

14. The vehicle operating device according to claim 13, further comprising:
 an individual authentication processing unit for authenticating an individual; and
 a proficiency management unit for managing said proficiency level determined by said proficiency determination unit for each individual who is authenticated by said individual authentication processing unit, wherein
 said main processing unit obtains a proficiency level of an individual authenticated by said individual authentication processing unit from said proficiency management unit, and modifies said spatial operation method to be recognized by said spatial operation unit or said content to be displayed on said display unit in accordance with said obtained proficiency level.

15. The vehicle operating device according to claim 1, wherein said voice operation unit begins recognition of said uttered voice when a specific spatial operation is recognized by said spatial operation unit.

16. The vehicle operating device according to claim 1, wherein when said spatial operation unit recognizes that a spatial operation is continued, said voice operation unit continues a voice input.

17. The vehicle operating device according to claim 1, wherein said voice operation unit comprises a plurality of types of recognition dictionaries used in voice recognition, and switches between said recognition dictionaries in accordance with said spatial operation recognized by said spatial operation unit.

* * * * *